(12) United States Patent
Berson

(10) Patent No.: US 6,783,670 B1
(45) Date of Patent: Aug. 31, 2004

(54) DEVICE SUITABLE FOR TREATING LIQUIDS, IN PARTICULAR CONTAMINATED WATER

(75) Inventor: Johannes Jacobus Berson, Paraza (FR)

(73) Assignee: Orben Advisors S.A., Tortola (VG)

( * ) Notice: Subject to any disclaimer, the term of this patent is extended or adjusted under 35 U.S.C. 154(b) by 141 days.

(21) Appl. No.: 10/148,152

(22) PCT Filed: Nov. 17, 2000

(86) PCT No.: PCT/EP00/11572

§ 371 (c)(1),
(2), (4) Date: Sep. 24, 2002

(87) PCT Pub. No.: WO01/38231

PCT Pub. Date: May 31, 2001

(30) Foreign Application Priority Data

Nov. 24, 1999 (NL) .............................................. 1013660

(51) Int. Cl.[7] ................................................. C02F 1/32
(52) U.S. Cl. .................... 210/154; 210/748; 422/186.3; 250/435
(58) Field of Search .............................. 210/154, 198.1, 210/205, 748; 422/24, 186.3; 250/432 R, 433, 435, 436, 437, 438

(56) References Cited

U.S. PATENT DOCUMENTS

| 4,204,956 A | 5/1980 | Flatow ......................... 210/87 |
| 4,767,932 A | 8/1988 | Ellner ......................... 250/435 |
| 5,019,256 A | 5/1991 | Ifill et al. .................... 210/232 |
| 5,208,461 A * | 5/1993 | Tipton ......................... 250/436 |
| 5,368,826 A * | 11/1994 | Weltz et al. ................. 422/243 |
| 5,624,573 A * | 4/1997 | Wiesmann ................... 210/748 |
| 5,937,266 A | 8/1999 | Kadoya .................... 422/186.3 |
| 6,231,820 B1 * | 5/2001 | Wedekamp .............. 422/186.3 |
| 2002/0113021 A1 * | 8/2002 | Traubenberg et al. ....... 210/748 |

FOREIGN PATENT DOCUMENTS

| DE | 41 19 725 | | 1/1993 |
| DE | 93 20 594.5 | | 2/1995 |
| JP | 63-126593 A | * | 5/1988 |
| WO | 99/14161 | | 3/1999 |

* cited by examiner

*Primary Examiner*—Frank M. Lawrence
(74) *Attorney, Agent, or Firm*—Ladas & Parry

(57) ABSTRACT

A device suitable for treating liquids, in particular contaminated water, which device comprises a treatment chamber and a liquid inlet and a liquid outlet connected to said treatment chamber, wherein a plurality of substantially parallel ultraviolet lamps are disposed in said treatment chamber, wherein said ultraviolet lamps are movable with respect to each other.

20 Claims, 1 Drawing Sheet

DEVICE SUITABLE FOR TREATING LIQUIDS, IN PARTICULAR CONTAMINATED WATER

Figure 1:
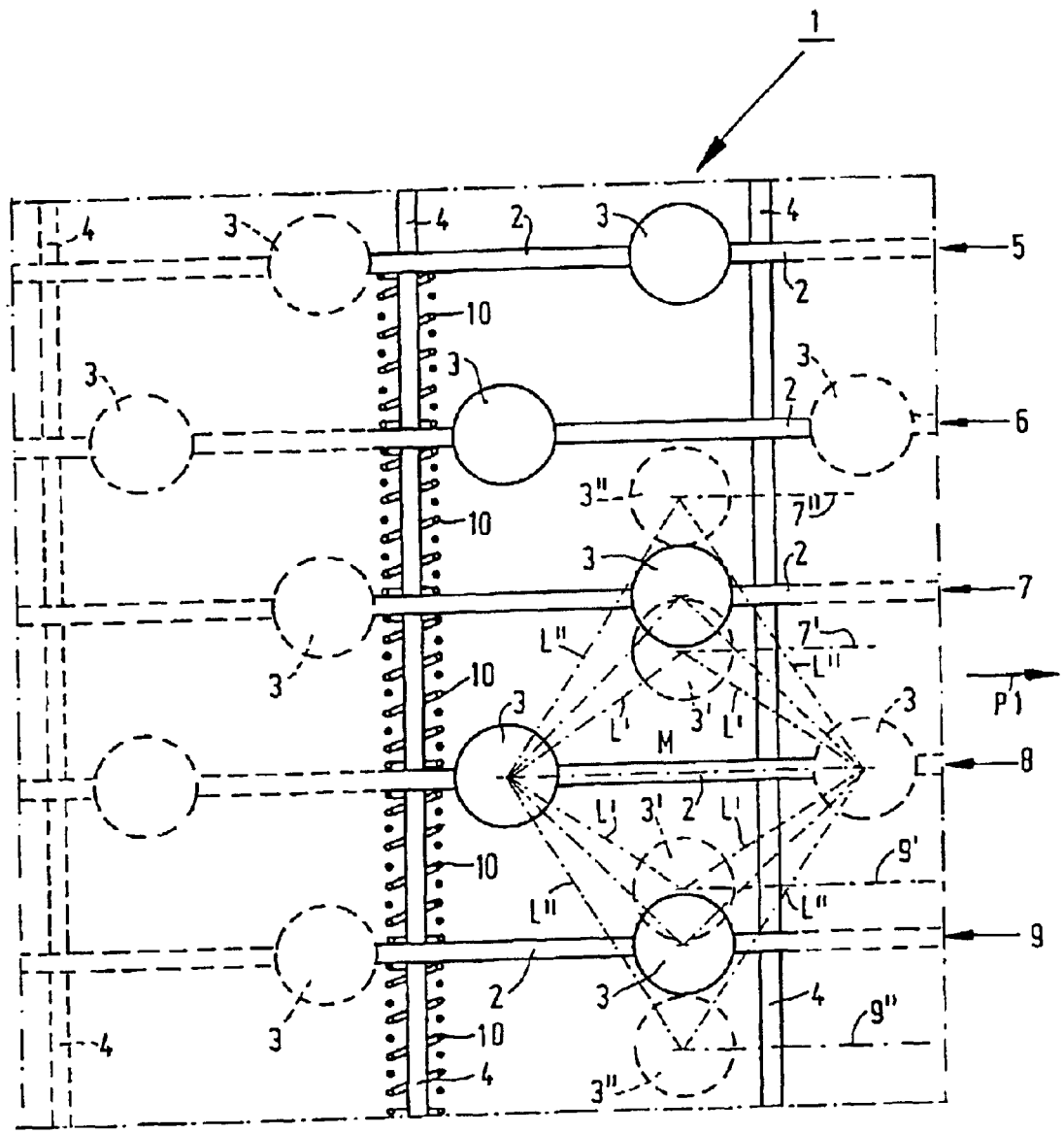

This application is a 371 of international application no. PCT/EP00/11572, filed on Nov. 17, 2000, which designated the United States of America.

FIELD OF THE INVENTION

The invention relates to a device suitable for treating liquids, in particular contaminated water, which device comprises a treatment chamber and a liquid inlet and a liquid outlet connected to said treatment chamber, wherein a plurality of substantially parallel ultraviolet lamps are disposed in said treatment chamber, which ultraviolet lamps are arranged in substantially parallel planes and which are movable with respect to each other.

BACKGROUND OF THE INVENTION

In a similar device known from German utility model no. 93.20.594.5 a plurality of ultraviolet (UV) lamps are disposed in the treatment chamber, wherein a fluid flowing through the treatment chamber, such as contaminated water, for example, is cleaned by means of the UV radiation emitted by said UV lamps.

In this prior art device the planes are pivotally connected near a first longitudinal side to a construction that can float on the water, whilst the second longitudinal side remote from said first longitudinal side rests on a bottom of the treatment chamber. When the water level in the treatment chamber rises, the construction will be moved in upward direction, with the planes taking up a different angle with respect to the bottom. The spacing between the planes slightly changes thereby.

The degree of contamination is determined by the dosage of ultraviolet radiation to which the liquid particles are exposed. The radiation emitted by an ultraviolet lamp depends on the age of the lamp, however. Moreover, the question whether water flowing past a UV lamp at some distance therefrom is irradiated with UV light furthermore depends on the spacing between the lamps and the transmission value of the liquid.

One drawback of the prior art device is the fact that in the case of a different transmission value of the liquid to be treated or of a reduced emission of UV light resulting from ageing of a lamp, only a limited change of the spacing between the planes can be effected, as a result of which not all liquid particles will be irradiated to a Sufficient degree and an optimum cleaning effect is not obtained.

OBJECTS AND SUMMARY OF THE INVENTION

The object of the invention is to provide a device by means of which the drawbacks of the prior art are avoided.

This objective is accomplished with the device according to the invention in that said planes can be translated with respect to each other only in a direction transversally to said planes whereby distances between a first and a second lamp of one plane to the closest lamp in another plane are always identical.

Since the lamps are movable with respect to each other in a direction transversally to the planes it is possible to adjust practically any desired distance between the lamps in dependence on the dosage of UV radiation that is minimally required. In this manner the desired liquid cleaning effect can be guaranteed.

Parallel planes can be moved relatively easily with respect to each other by mechanical, hydraulic and/or pneumatic means. Preferably, springs are disposed between the respective planes, whereby movement of the outer planes with respect to each other also causes the planes disposed therebetween to be moved, with all planes being spaced the same distance apart.

One embodiment of the device according to the invention is characterized in that the lamps of a first plane are staggered with respect to the lamps of the second plane disposed opposite said first plane.

As a result of the staggered arrangement of the lamps, an in particular if the lamps of one plane are disposed centrally between respective lamps of another plane, an adequate distribution of the radiation will be obtained irrespective of the spacing between the planes.

Yet another embodiment of a device according to the invention is characterized in that the planes extend substantially horizontally in use, wherein a plane disposed near the upper side is connected to an element that floats on the liquid to be treated.

As a result, the spacing between the planes is determined by the level of the liquid present in the treatment chamber. When the liquid level is relatively low, the force of gravity will cause the floating element to move in downward direction, as a result of which the planes will be positioned more closely together. When the liquid level in the chamber rises, the floating element will automatically move upwards and the planes will be moved further apart. In this manner it is possible to reduce the amount of liquid being supplied to the treatment chamber when treating a liquid having a relatively low transmission value, as a result of which the planes will automatically be moved towards each other and the spacing between the lamps will be reduced, so that in spite of the low transmission value a sufficiently high dosage of UV radiation will still be supplied to all liquid particles.

BRIEF DESCRIPTION OF THE INVENTION

The invention will be explained in more detail hereafter with reference to the drawing, wherein FIG. 1 shows a device according to the invention.

DETAILED DESCRIPTION

FIG. 1 shows a device 1 according to the invention, comprising a plurality of horizontally extending strips 2, horizontally extending lamps 3 disposed within quartz tubes, and vertically extending guide rods 4. Strips 2 and lamps 3, which extend substantially transversely to each other, are interconnected near their ends. Strips 2 and lamps 3 are arranged in several planes 5–9, wherein the lamps 3 in first planes 5, 7, 9 are disposed centrally between lamps 3 of second planes 6, 8 positioned therebetween.

Only five planes are shown in FIG. 1. It will be understood that the number of planes, the number of guide rods and the number of lamps disposed between two guide rods can be adapted in dependence of, among other things, the dimension of the treatment chamber (not shown), the liquid to be treated, etc.

All guide rods 4 are surrounded by springs 10, which are each connected to a strip 2 of a first plane 5, 7, 9 with a first end and to a strip 2 of a second plane 6, 8 with a second end. Springs 10 keep the various planes 5–9 a predetermined distance apart.

Lamps 3 are disposed in quartz tubes, which are further filled with air, for example. As a result, lamps 3 will experience an upward force in water. Owing to the weight of the strips 2 connected to the lamps 3, said lamps 3 will experience a downward force.

A suitable selection of the type of strips and the weight thereof makes it possible to have the planes float in the water, as it were, so that the distance between the planes is determined exclusively by the springs.

The operation of the device 1 will now be briefly explained.

Water to be cleaned is introduced, via a water inlet (not shown), into a treatment chamber, in which device 1 is present. Water flows past the UV light emitting lamps 3 and exits the treatment chamber in the direction indicated by arrow P1 via a water outlet.

In order to obtain a desired cleaning effect of the water, a specific dosage of UV radiation must be delivered to the water. The question whether all liquid particles actually receive the desired dosage depends, among other things, on the transmission value of the contaminated water and the age of the UV lamps 3.

When it is desired to increase the received dosage of UV radiation, in particular near the centre M between the lamps, the uppermost plane is pressed in downward direction by mechanical, pneumatic, hydraulic means that are known per se or by means of an element floating on the liquid as described above, whereby the springs 10 present between the respective planes will move all planes with respect to each other in order to achieve a desired spacing between the planes.

It is also possible to move the lowermost plane in upward direction of course.

In the situation that is shown in FIG. 1 plane 8 has not been moved, as it were, whilst the surrounding planes 7, 9 have been moved towards plane 8, forming planes 7' and 9' including UV lamps 3'. Lamps 3' are now spaced a distance L' apart from all lamps 3 of the adjacent planes.

When the water has a relatively high transmission value and/or the lamps are relatively new and/or a relatively low UV dosage is desired, the planes 5–9 can be moved further apart, wherein planes 7 and 9 move to the position indicated at 7" and 9" with respect to plane 8 and the lamps 3" of planes 7" and 9' take up the position illustrated in FIG. 1, wherein lamps 3" are spaced a distance L" apart from the lamps 3 of the surrounding planes.

It will be understood that FIG. 1 only shows the movement of one lamp 3 of plane 7 and of plane 9 with respect to a stationary plane 8 in FIG. 1. In practice it will be preferred for the lowermost plane to be rigidly connected to the treatment chamber and the other planes arranged thereabove to be movable with respect to the lowermost plane.

It is also possible, of course, to have the planes moved with respect to each other by means of screwed spindles, piston-cylinder combinations or other mechanical, pneumatic of hydraulic means.

It is also possible, of course, for the lamps of a plane to be movable with respect to each other.

The arrangement of lamps in planes and springs disposed between said planes makes it possible in a simple manner to space all planes a new distance apart.

It is also possible, of course, to provide each lamp with a separate driving mechanism, by means of which the lamps can be moved to substantially any position in the treatment chamber.

It is also possible to interconnect the strips 2 of a plane by means of connecting strips extending transversely to said strips 2.

It is also possible to have the water flow parallel to said lamps.

It is also possible to provide the strips with a particular flow profile, so that the water will undergo a turbulent flow.

What is claimed is:

1. A device suitable for treating liquids, which device comprises a treatment chamber and a liquid inlet and a liquid outlet connected to said treatment chamber, wherein a plurality of substantially parallel ultraviolet lamps are disposed in said treatment chamber, which ultraviolet lamps are arranged in parallel planes and which are movable with respect to each other, wherein planes can be translated with respect to each other only in a direction transversely to said planes whereby distances between a first and a second lamp of one plane to a closest lamp in another plane are always identical.

2. A device according to claim 1, wherein lamps of a first plane are staggered with respect to the lamps of a second plane disposed opposite said first plane.

3. A device according to claim 2, wherein a lamp of said first plane is positioned substantially centrally between two adjacent lamps of said second plane.

4. A device according to claim 1, wherein springs are disposed between said planes.

5. A device according to claim 1, wherein each plane comprises strips extending transversely to the lamps, by means of which strips the lamps are detachably interconnected, whilst the device furthermore includes guide rods extending transversely to said strips and said lamps, with respect to which the strips and the lamps connected thereto are jointly movable.

6. A device according to claim 1, wherein the planes can be moved with respect to each other by mechanical, pneumatic and/or hydraulic driving means.

7. A device according to claim 1, wherein said planes extend substantially horizontally in use, wherein a plane disposed near an upper side is connected to an element that floats on the liquid to be treated.

8. A device as claimed in claim 1, wherein the liquid to be treated is contaminated water.

9. A device as claimed in claim 2, wherein the liquid to be treated is contaminated water.

10. A device as claimed in claim 3, wherein the liquid to be treated is contaminated water.

11. A device as claimed in claim 4, wherein the liquid to be treated is contaminated water.

12. A device as claimed in claim 5, wherein the liquid to be treated is contaminated water.

13. A device as claimed in claim 6, wherein the liquid to be treated is contaminated water.

14. A device as claimed in claim 7, wherein the liquid to be treated is contaminated water.

15. A device according to claim 2, wherein each plane comprises strips extending transversely to the lamps, by means of which strips the lamps are detachably interconnected, whilst the device furthermore includes guide rods extending transversely to said strips and said lamps, with respect to which the strips and the lamps connected thereto are jointly movable.

16. A device according to claim 3, wherein each plane comprises strips extending transversely to the lamps, by means of which strips the lamps are detachably interconnected, whilst the device furthermore includes guide rods extending transversely to said strips and said lamps, with respect to which the strips and the lamps connected thereto are jointly movable.

17. A device according to claim 2, wherein said planes extend substantially horizontally in use, wherein a plane disposed near an upper side is connected to an element that floats on the liquid to be treated.

18. A device according to claim 3, wherein said planes extend substantially horizontally in use, wherein a plane disposed near an upper side is connected to an element that floats on the liquid to be treated.

19. A device according to claim 5, wherein said planes extend substantially horizontally in use, wherein a plane disposed near an upper side is connected to an element that floats on the liquid to be treated.

20. A device according to claim 6, wherein said planes extend substantially horizontally in use, wherein a plane disposed near an upper side is connected to an element that floats on the liquid to be treated.

* * * * *